Aug. 15, 1950 J. C. COE 2,518,449

NOISE LIMITER

Filed Aug. 11, 1945 2 Sheets-Sheet 1

Inventor
James C. Coe,

By Ralph L. Chappell
Attorney.

Aug. 15, 1950 J. C. COE 2,518,449

NOISE LIMITER

Filed Aug. 11, 1945 2 Sheets-Sheet 2

Inventor
James C. Coe
By Ralph L Chappell
Attorney

Patented Aug. 15, 1950 2,518,449

UNITED STATES PATENT OFFICE 2,518,449

NOISE LIMITER

James C. Coe, Washington, D. C.

Application August 11, 1945, Serial No. 610,380

13 Claims. (Cl. 250—20)

(Granted under the act of March 3, 1883, as amended April 30, 1928; 370 O. G. 757)

My invention relates to noise limiters for radio receiving sets and the like, particularly to series-type noise limiters provided with a gate which is determined by two opposing voltages. According to my invention, the first of the two voltages may be fixed, and the second may vary automatically with average carrier strength. The second voltage is normally produced by the detector of a radio receiver.

Alternatively, the first of the two voltages may vary in substantially inverse proportion to the automatic gain control (AGC) voltage developed, and the second voltage, as before, may vary with average carrier strength.

The first voltage, whether fixed or decreasing with AGC action, constitutes a bias against the limiter tube employed in my invention. The second voltage tends to overcome the bias against the limiter.

An object of my invention is to provide an improved and simplified noise limiter which maintains its effectiveness at low carrier levels and thereby permits the receiver to reproduce intelligible signals which would otherwise be obscured. The fact that the noise limiter, according to my invention, is effective at low carrier levels constitutes a substantial advance over the prior art noise limiters as hereinafter pointed out.

A further object of my invention is to provide a noise limiter, the limiting action of which will be reduced with very strong carriers such that limiting will not occur at a low percentage modulation level for strong carriers. To accomplish this object, the voltage comrising the bias against the limiter is reduced with AGC action.

A further object of my invention is to provide a noise limiting device which will also operate as a squelch device in case of the reception of an extremely low intensity carrier or of no carrier. Unlike squelching devices known heretofore, the noise limiter of my invention operates to limit the percentage modulation to lower values as the carrier intensity decreases. The limiter clips down to lower percentage modulation as the strength of the carrier decreases until at extremely low carrier strength, substantially all of the modulation is clipped, blanking the audible output. Known squelch circuits, such as that disclosed in the patent to Noble, 2,343,115, operate on the principle of reducing the amplification of one or more stages of the receiver as carrier strength is reduced, and not on the series limiter principles involved in my invention.

A further object of my invention is to provide a noise limiter which will limit that side of the audio cycle corresponding to low instantaneous current values through the detector load resistor (corresponding to troughs of the modulated carrier envelope) without the addition of a second limiter tube.

A further object of my invention is to provide an effective noise limiting device to accomplish both limiting and squelching action with a minimum of insertion loss, which will not only overcome the disadvantage experienced when prior art devices have been inserted in rendering weak signals inaudible, but will on the other hand, render weak signals more intelligible by providing comparatively little reduction in signal compared to the reduction in noise.

A further object is to provide an effective noise limiter for insertion in existing receivers without adding to or changing any of the R. F. or I. F. transformers, without requiring additional power supply, utilizing a minimum of inexpensive small tubes and other parts, and which may be easily adjusted and will not be unstable or critical of adjustment.

Further objects and advantages of my invention will be apparent from the following description taken in conjunction with the drawings in which.

It will be assumed in the following discussion that the noise limiter of this invention is applied at the second detector stage of a superheterodyne receiver for either continuous wave or amplitude modulated audio reception. It will be apparent that the application could be at the detector stage of a tuned radio frequency type of receiver. The invention is applicable to modulated or unmodulated continuous wave reception, to direction finders, and to most types of amplitude modulated receivers.

Figure 2:
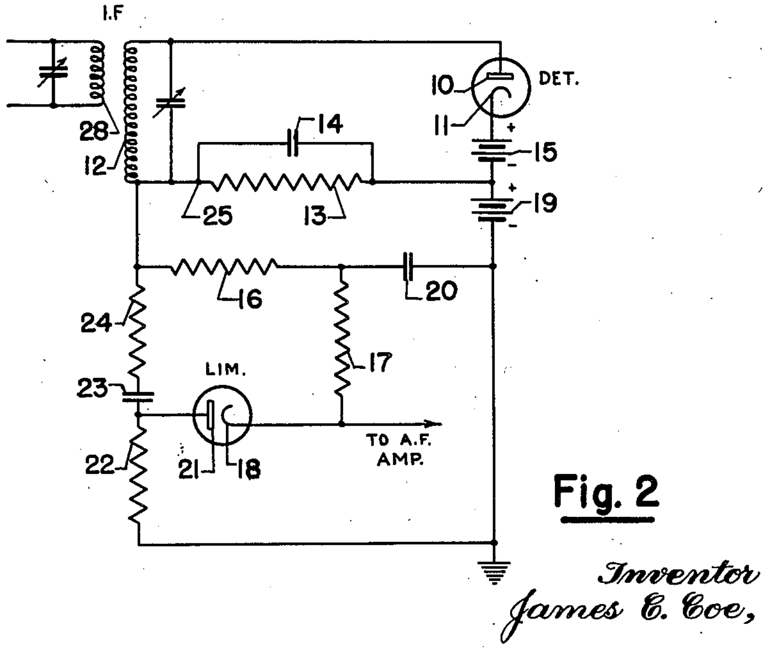
Fig. 2 is a circuit diagram of a noise limiter utilizing fixed bias against the limiter in accordance with the preferred embodiment of my invention.

The noise limiting device diagrammatically presented in Fig. 2 comprises a diode detector of conventional type, with anode 10 and cathode 11 arranged to rectify the intermediate frequency (I. F.) signal voltage produced across I. F. transformer secondary 12 to provide unidirectional current through load resistance 13 shunted by filter capacitance 14 in response to detection of carrier waves which will produce negative potentials at a point 25. The detector is shown biased by battery 15. From point 25 a resistor 16 is connected in series with a resistor 17 to the cathode 18 of a diode limiter tube to provide a positive biasing potential from a battery 19 to the cathode. A condenser 20 is connected from the juncture of resistors 16 and 17 to the negative terminal of battery 19 in order to store the biasing potential for cathode 18. The negative bias return from the anode 21 of the limiter tube is through resistor 22 to the negative terminal of battery 19. Also connected to anode 21 are a D. C. blocking condenser 23 and I. F. filter resistor 24 in series arranged to furnish negative audio frequency potentials appearing at point 25 to the limiter anode. The circuit constants are so arranged, as listed below, as to prevent substantial amounts of I. F. potential or D. C. potential from reaching anode 21 from point 25. Resistors 16 and 17 combined with capacitor 20 prevent I. F. or audio frequency potentials appearing at point 25 from changing the potential of cathode 18 because the product of the values of resistor 16 and condenser 20 is relatively high to prevent rapid fluctuations in the potential on the ungrounded side of condenser 20. Consequently the cathode potential is determined by the biasing potential of battery 19 and direct current potentials appearing at point 25, the latter potentials being produced whenever the detector is conductive in response to the appearance of either a modulated or unmodulated I. F. signal appearing across transformer secondary 12.

In operation the device disclosed in Fig. 2 serves to limit the peak audio potential which can pass through the limiter diode to reach the audio frequency amplifying system of the receiver. If an unmodulated I. F. carrier results in a signal voltage across transformer secondary 12 of a magnitude sufficient to overcome the detector bias to drive anode 10 positive during at least a portion of each I. F. cycle, the diode tube will rectify to produce at point 25 a negative potential of a magnitude dependent upon the portion of the carrier above the detector bias potential. Condenser 14, in a well-known manner, serves to filter this negative rectified potential, reducing the I. F. ripple and producing a substantially constant direct current potential at point 25, since the carrier is unmodulated. The potential at point 25 is imposed on condenser 20 to cause the ungrounded side of this condenser to become negative if it is of sufficient magnitude to overcome the initial bias from battery 19. This negative potential is provided to the cathode 18 through resistor 17, allowing the limiter tube to become conductive up to a certain modulation percentage. In other words, the potential appearing at 25, due to the reception of a sufficiently strong carrier, has overcome the bias against the limiter provided by battery 19. It will be apparent that the carrier potential provided across transformer secondary 12 must be strong enough to overcome the detector bias produced by battery 15 before a negative potential will be produced at point 25. It will also be apparent that this negative potential at point 25 must be as great as the potential of battery 19 before all positive bias is removed from cathode 18 of the limiter diode. Accordingly, if an unmodulated carrier is being received of less intensity than is required to reduce the bias against the limiter to zero, i. e. to reduce the potential on the ungrounded side of condenser 20 to zero, to obtain any audible output through the limiter will require detection of a noise pulse, or pulses, modulated on the I. F. of sufficient amplitude and duration to produce a negative potential at point 25 that will be sufficient to overcome the positive charge on the ungrounded plate of condenser 20, through resistor 16, and to drive this plate negative. Even then the noise peaks will be prevented from passing through the limiter since their aggregate peak value drives diode anode 21 negative with respect to cathode 18. Therefore, cathode 18 becomes negative and the limiter conductive only to the noise represented as low percentage modulation, which will pass through the limiter. Accordingly, the noise impulses must first contain enough energy to reverse the charge on condenser 20, which is of relatively high capacity, through relatively high resistance 16, and then having opened the gate of the limiter, the impulses will still be clipped by the limiter tube at a low percentage modulation level determined by the value to which condenser 20 has been charged. If the carrier voltage appearing across transformer secondary 12 is strong enough to overcome the detector bias provided by battery 15, a negative direct current potential will appear at point 25. Assuming that such a carrier is received but that the carrier is not strong enough to produce at point 25 a negative potential sufficient to overcome the bias against the limiter, noise pulses modulated on this carrier to reach the audio amplifier at all must be of sufficient amplitude and duration to produce negative pulses at point 25 of great enough energy to provide the additional potential on condenser 20 necessary to overcome the bias against the limiter (i. e. to make the ungrounded plate of the condenser and cathode 18 negative). The limiter will not start to conduct, therefore, until a pulse, or series of pulses, arrives of sufficient amplitude and duration to overcome the remaining positive cathode bias and then, as before, the pulses will be clipped as determined by the amount of the negative charge produced by them on the cathode and condenser 20 due to the time constant determined by the product of the values of resistor 16 and condenser 20. The detector bias under these circumstances has removed everything from the input carrier except the negative portion greater than the detector bias to permit this portion of the audio signal (which is produced at point 25) to reach the limiter. The negative potential at point 25 must be great enough and of sufficient duration to overcome the bias against the limiter before the limiter can conduct. The assumption was that the carrier alone was not strong enough to produce sufficient negative potential at point 25. The noise impulses appearing at point 25 are therefore first used up at least partially to overcome the bias against the limiter and are then subjected to clipping by the limiter at a level, as heretofore, determined by the negative potential developed on cathode 18 and condenser 20. It is operation in this region, as the carrier becomes weaker so as to generate insufficient negative potential at point 25 to open the gate, that the device acts to decrease the percentage modulation at which clipping occurs, both as to noise impulses and audio modulations, and the squelching action is effective. It will be understood that the percentage modulation at which clipping occurs is determined by the negative potential on the ungrounded plate of condenser 20, and cathode 18, and that weaker signals will result in less negative potentials at point 25 and therefore a less negative charge on cathode 18, allowing the limiter to clip lower and lower until for extremely weak signals, the clipping is at substantially zero per cent modulation.

Without the bias against the limiter afforded by battery 19, the clipping at lower and lower percentage modulation levels as the carrier strength is decreased would not occur. In the absence of this bias, the action of a limiter of a type that has been used prior to my invention would produce action indicated by curve 5 of Fig. 1, wherein for lower carrier strengths, shown as less than 10 mv./meter, the percentage modulation level at which limiting is effective rises, resulting in better quality but greatly reduced signal-to-noise ratio. Curve 6 is applicable to the device disclosed in Fig. 2 discussed above. For lower carrier strength, this device provides poorer quality but increased intelligibility because of the increasing signal-to-noise ratio. It will be apparent that in the reception of weak signals, quality is a secondary consideration. Voice signals clipped even down to a five per cent modulation level are intelligible because most of the intelligibility is derived from the consonants, yet these in the spoken voice are much weaker than the vowel components. Accordingly, the consonants modulate the carrier to a low percentage level, the vowels at a high percentage level. My device, therefore, for weak carriers, discriminates against vowels and noise pulses to a greater extent than for stronger carriers. There is little attenuation of the consonants in the case of severe limiting of a low intensity carrier by the device according to my invention, and it is relatively immaterial to intelligibility that the vowel sounds are greatly attenuated. The result is much improved intelligibility and signal-to-noise ratio at low carrier strengths for my device as compared to known noise limiters.

Figure 1:
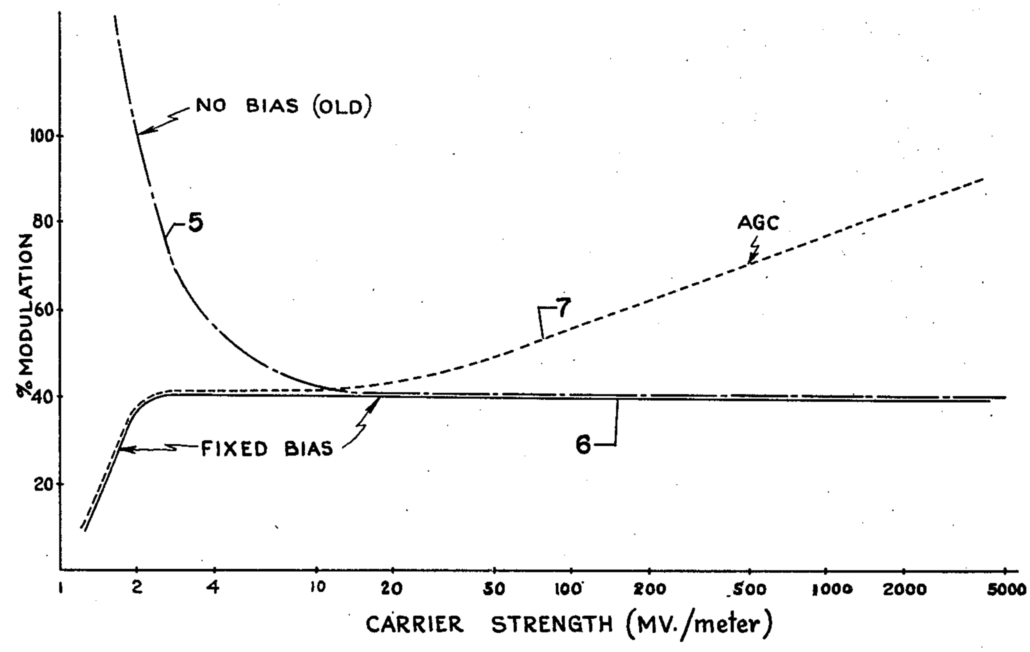
Fig. 1 is a diagrammatic presentation of the characteristics of noise limiters as discussed herein, showing the percentage modulation at which clipping takes place for different levels of incoming carrier wave field strength.

As will be noted from curve 6 of Fig. 1, the constants chosen for use in the device of Fig. 2, as listed hereinafter, are such as to produce clipping at approximately a forty per cent modulation level in a particular receiver. Other constants may be applied to change this level as desired. The numerical values for carrier strength are exemplary only and will be different for receivers with different characteristics.

The effect discussed above for weak carriers, wherein the clipping or limiting is at an increasingly low percentage modulation level for lower carrier intensity is particularly desirable in the case of reception of a directional A-N code, or similar beam. If the carrier strength of the beam is low, the weaker carrier will be clipped to a lower percentage modulation than the stronger carrier. This affords an amplification of the difference in beam intensities such that if the plane is in the A quadrant, the A signals will produce an audible signal, due to limiting at a higher level, much stronger than the N signals which are limited at a lower level. The difference in intensity is therefore much more pronounced than if the signals were not subjected to differential limiting. It will be noted that the limiters acting in accordance with curve 5 of Fig. 1 would make the difference less pronounced because of limiting at higher levels, giving proportionately greater audio output for the signal on the lower intensity carrier.

Figures 3, 4:
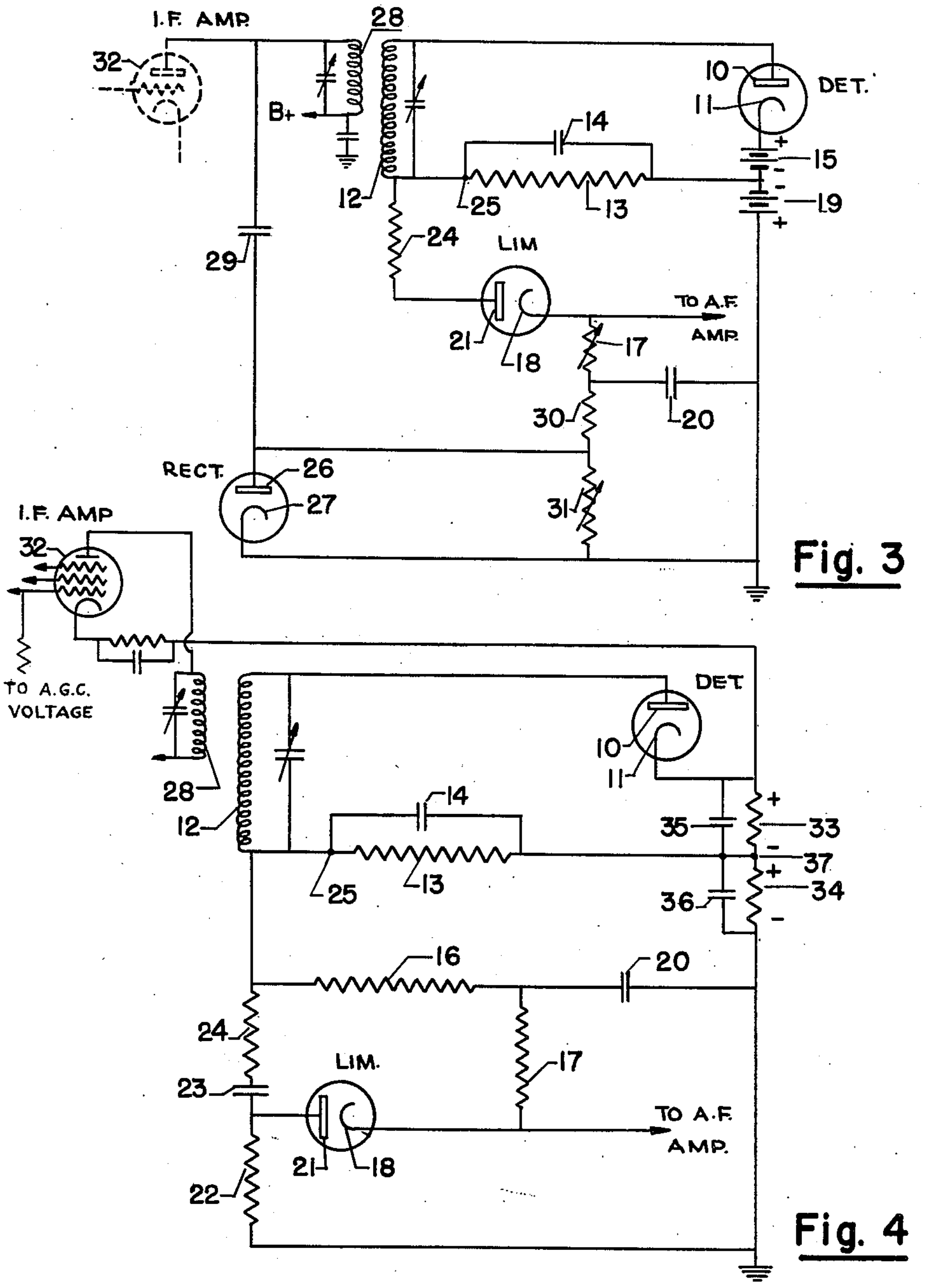
Fig. 3 is a circuit diagram of a modification of the preferred embodiment incorporating certain refinements and utilizing fixed bias against the limiter.
Fig. 4 is a circuit diagram of the preferred embodiment modified to utilize AGC controlled bias against the limiter.

Fig. 3 discloses a circuit similar to that shown in Fig. 2 except that the potential used to overcome the bias against the limiter is developed from a separate rectification of the I. F. carrier wave. In the drawing, the potential developed in the presence of a carrier to overcome the bias against the limiter is produced by a separate diode rectifier tube comprising anode 26 and cathode 27 furnished with I. F. potentials from the input to transformer primary winding 28 through a condenser of relatively small capacity 29. In the presence of a carrier, the negative potential produced on plate 26 is used to charge condenser 20 through a resistor 30, this negative biasing potential being supplied to cathode 18 through resistor 17 to overcome the positive bias of battery 19, which reaches the cathode 18 through resistors 31, 30, and 17 in series. Negative bias from the battery to the anode 21 is provided through detector load resistor 13 and I. F. filter resistor 24. It will be noted that no direct current blocking capacitor is necessary between the point 25 and anode 21. The negative potential, including negative going audio frequency pulses, produced at point 25 in response to the rectification of a carrier is impressed on anode 21 in addition to the negative bias from battery 19. The circuit constants are so arranged that because of losses in the I. F. transformer, consisting of primary winding 28 and secondary winding 12, the negative potential produced through carrier rectification at plate 26, which is impressed on cathode 18, is somewhat greater than the negative potential produced by carrier rectification at point 25. Accordingly, in the presence of a carrier, the negative potential produced on cathode 18 is great enough to overcome the negative potential produced from the carrier applied to anode 21 and if the carrier is of more than a very small magnitude, the negative potential applied from plate 26 to the cathode will also overcome the positive bias of battery 19, so as to enable the limiter to pass to the audio frequency amplifying section a portion of the audio signal produced at point 25.

The operation of this circuit is similar to that described in connection with Fig. 2 in all respects except that the bias against the limiter is overcome by the rectification of the carrier produced at the input to the transformer windings instead of utilizing only the negative potential resulting from carrier rectification at point 25. Rectified carrier potentials appearing at point 25 actually increase the effective bias against the limiter by adding additional negative potentials to the negative potential provided by battery 19 to the anode 21. Accordingly, the anode 26 must produce a greater negative potential than that applied to anode 21 to make the limiter conductive. In case a modulated carrier is being received, negative audio pulses are produced at point 25 and furnished to anode 21 through resistor 24. This negative signal can pass through the limiter only up to the value corresponding to the percentage modulation level determined by the negative bias on cathode 18 and the nongrounded side of condenser 20. The bias against the detector serves to clip the audio frequency modulations in the portions represented by troughs in the modulated carrier envelope at some predetermined distance from the zero value of the carrier, this being the side of the audio cycle corresponding to low instantaneous current values through the detector load resistor 13, the distance being determined by the value of the bias against the detector produced by battery 15 and loading on the detector. This acts as a clipper for anything over, for example, seventy per cent modulation in the direction in which rectified currents would tend to be reduced momentarily toward zero. In other words, no signal is allowed to produce an audio potential at point 25 that was impressed on the carrier in such a way as to reduce the carrier envelope to less than thirty per cent of the carrier's unmodulated amplitude. The limiter serves to clip signals which appear as peaks on the modulated carrier envelope. This occurs because any modulation that appears on the incoming carrier which is rectified to produce at point 25 an instantaneous negative potential greater than the negative biasing potential on the ungrounded side of condenser 20 will momentarily drive anode 21 negative with respect to the cathode, which will prevent passage of the signal.

Resistor 31 of the device, in accordance with Fig. 3, is conveniently made variable to enable adjustments to the clipping level. Reducing the resistance of this resistor will result in lowering the percentage modulation level at which clipping occurs by decreasing the negative gating potential produced in response to a carrier of a particular intensity. Less potential is therefore produced to overcome the bias against the limiter, the ungrounded side of capacitor 20 will be less negative and the modulation will be clipped at a lower percentage value.

The rectifier circuit including anode 26 and cathode 27 may be arranged in a well known manner as a voltage doubler circuit, by adding another diode and appropriate condensers, if it is desired to decrease the clipping action of the limiter, i. e. raise the percentage modulation level at which clipping occurs. Using a voltage doubler may be particularly desirable if the I. F. transformer has low loss between primary 28 and secondary 12, or if it has a 1 to 1 ratio. The use of a step down I. F. transformer tends to make a voltage doubler unnecessary.

Resistor 17 is conveniently made variable since it has been found that better results are obtained for speech reception with a low resistance value, and for music with a somewhat higher resistance, because a lower resistance results in greater A. C. loading of the detector, and consequently, more clipping on that side of the audio cycle represented by low instantaneous currents through the detector. A low resistance may introduce undesirable distortion for music but will give an increased intelligibility for voice reception as heretofore pointed out.

For very low carrier strength, the circuit of Fig. 3 acts to reduce the percentage modulation in a manner similar to that described in Fig. 2. The biased diode detector operates in a well known manner to clip off all modulations which correspond to low instantaneous detector currents, the value being determined by the voltage of battery 15. If the carrier becomes weaker, this voltage comprises an increased proportion of the total envelope strength, and thus serves to limit the percentage modulation reproduced at point 25 in the direction represented by the modulation troughs on the rectified carrier envelope, i. e., the low instantaneous detector currents. It will also be seen that as the carrier is reduced in strength, the negative potential produced on anode 26 will be reduced to a value lower than that required to produce a substantial negative bias on the ungrounded side of capacitor 20. As the negative bias on the ungrounded side of capacitor 20 is reduced, that portion of the modulation represented by peaks on the carrier envelope is increasingly clipped. Just as in Fig. 2, the circuit of Fig. 3 operates to decrease the percentage modulation allowed to pass through the limiter with decreasing carrier strength until at very low carrier intensity substantially all output through the limiter ceases. Because the noise on decreasing signal strength becomes increasingly objectionable, this is most desirable, as previously explained.

Fig. 4 discloses a circuit utilizing bias potentials against the limiter, and against the detector, produced by current through cathode biasing resistors provided in the cathode lead to an amplifier tube of the receiver which is subject to AGC action. As shown in the Fig. 4, the cathode of I. F. amplifier tube 32 draws current through resistors 33 and 34 to produce a positive bias on the cathode of tube 32. The resistors may be bypassed by condensers 35 and 36. When tube 32 draws current, a positive potential is produced on the ungrounded side of resistor 34 at point 37, which is applied through resistors 13 and 16 to the ungrounded plate of condenser 20 and through resistor 17 to the cathode 18 of the limiter tube. Return from the anode 21 of the limiter to the negative (grounded) end of resistor 34 is through resistor 22. Detector bias is obtained from resistor 33, bypassed by condenser 35, producing a positive bias potential on cathode 11, the negative bias being provided from point 37 through resistor 13 and transformer secondary 12 to anode 10. Otherwise the circuit will be seen to be substantially the same as that shown in Fig. 2.

The operation of the circuit of Fig. 4 will be modified from that described above for Figs. 2 and 3 in that the bias voltages against the detector and against the limiter will be reduced with increased carrier strength which increases AGC action on tube 32. This will result in increasing the percentage modulation permitted to pass through the limiter with increasing signal strength. It will be seen that as AGC action increases, less and less cathode current is drawn by tube 32, and the bias against the detector is further and further reduced. This reduction prevents the clipping by the dector of the audio signal in those portions represented by troughs in the carrier envelope except at a level very close to the center of the modulated carrier envelope represented by troughs of very nearly one hundred per cent modulation. It will also be seen that the rectified carrier appearing as a negative potential at point 25 will produce enough negative bias on the ungrounded side of capacitor 20 to prevent clipping of the instantaneous audio peaks represented by peaks on the carrier envelope until these peaks represent very nearly one hundred per cent modulation, since the bias against the limiter, i. e., the voltage produced across resistor 34, will become negligible in value with respect to the negative potential produced at point 25 due to carrier rectification. It should be noted that in all of the above circuits the potential appearing across condenser 20 is partially determined by the average carrier strength but remains substantially unaffected by signal carrier modulations that may be present. This is so because of the relatively high storage capacity of this condenser and the high resistance of resistor 16, producing a circuit of long time constant.

Circuit constants which have been found suitable for the proper operation of the noise limiter are as follows:

| | Fig. 2 | Fig. 3 | Fig. 4 |
|---|---|---|---|
| Resistor 13 ........ megohms.. | 0.2 | 0.2 | 0.2 |
| Resistor 16 ........ do.... | 0.6 | -------- | 0.6 |
| Resistor 17 ........ do.... | 0.2 | 1.0 | 0.2 |
| Resistor 22 ........ do.... | 0.6 | -------- | 0.6 |
| Resistor 24 ........ do.... | 0.1 | 0.1 | 0.1 |
| Resistor 30 ........ do.... | -------- | 0.5 | -------- |
| Resistor 31 ........ do.... | -------- | [1] 2.0 | -------- |
| Resistor 33 ........ ohms.. | -------- | -------- | 200 |
| Resistor 34 ........ do.... | -------- | -------- | 70 |
| Condenser 14 ........ microfarads.. | .0001 | .0001 | .0001 |
| Condenser 20 ........ do.... | 0.1 | 0.1 | 0.1 |
| Condenser 23 ........ do.... | 0.1 | -------- | 0.1 |
| Condenser 29 ........ do.... | -------- | .0001 | -------- |
| Condenser 35 ........ do.... | -------- | -------- | 0.1 |
| Condenser 36 ........ do.... | -------- | -------- | 0.1 |
| Battery 15 ........ volts.. | [2] 2.0 | 2.0 | -------- |
| Battery 19 ........ do.... | [2] 0.7 | 0.7 | -------- |

[1] Variable. [2] Approximate.

These values are, of course, exemplary only, and various departures therefrom may be made, as may be circuit modifications, which will fall within the scope of the invention.

The invention described herein may be manufactured and used by or for the Government of the United States of America for governmental purposes without the payment of any royalties thereon or therefor.

What is claimed is:

1. In a receiver having an automatic gain control circuit, a demodulation circuit and an output circuit, a series limiter coupling said demodulation and output circuits to conduct noise and signal currents therebetween, means for providing a potential inversely proportional to that of said automatic gain control, and means for applying said potential to said demodulation circuit and said limiter to bias said circuit and limiter to non-conduction in the absence of a carrier signal of a predetermined amplitude.

2. The combination in a carrier wave receiver having an automatic gain control and a tube having its cathode current controlled by said gain control of a signal detector circuit and an output circuit, said detector circuit including a load impedance upon which appears a unidirectional potential having an average value determined by the strength of the detector current, a limiter connected between said impedance and said output circuit, means to control said limiter in accordance with said unidirectional potential to aid the conduction thereof, and means connected between said tube and said limiter and responsive to the cathode current in said tube to apply a potential to said limiter in opposition to said unidirectional potential for biasing said limiter toward non-conduction in the absence of a carrier of at least a predetermined intensity.

3. In a carrier wave receiver having an automatic gain control circuit, a detector circuit and an output circuit; a series limiter connected between said detector circuit and said output circuit comprising a diode tube, a filter circuit of relatively short time constant connected between said detector circuit and the anode of said diode, a filter circuit of relatively long time constant connected between said detector circuit and the cathode of said diode to provide a negative gating potential to the cathode of said diode, and means for applying a positive biasing potential varying inversely with the action of said automatic gain control to the cathode of said diode to increase the extent of limiting as the carrier wave intensity decreases below a predetermined intensity.

4. In combination in a carrier wave receiver having automatic gain control, a diode detector operating into a load circuit of relatively short time constant, an output circuit, conductive means connecting said load circuit to said output circuit, means for producing and applying a biasing potential of magnitude which varies inversely with the action of said automatic gain control to said first means to cause said first means to become non-conductive, and means coupled to said load circuit for producing and applying a gating potential proportional to the average carrier intensity in opposition to said biasing potential to said first means to cause said first means to become at least partially conductive.

5. In combination, a high frequency receiver having an automatic gain control and a detector circuit, an output circuit, means connected to transmit noise and signal currents from said detector circuit to said output circuit, biasing means for completely disabling said first means, said biasing means being responsive to said automatic gain control and means connected to said detector circuit for overcoming said biasing means to an extent determined by the detector current to cause said first means to transmit a limited portion of said noise and signal currents.

6. In combination in a carrier wave receiver having an automatic gain control, a diode detector operating into a load and filter circuit of relatively short time constant, an output circuit, a limiter connecting said load and filter circuit to said output circuit, means for producing and applying a biasing potential of a magnitude varying substantially as an inverse function of the voltage of said automatic gain control to said limiter to reduce the conductivity thereof, and means responsive to the average intensity of the carrier for producing and applying a gating potential of varying magnitude in opposition to said biasing potential to said limiter to cause said limiter to become at least partially conductive.

7. In a carrier wave receiver having an automatic gain control circuit, a detector circuit and an output circuit, a series limiter including a diode tube connected between said detector circuit and said output circuit, a filter circuit of relatively short time constant connected between the anode of said diode and said detector circuit, a filter circuit of relatively long time constant connected between said detector circuit and the cathode of said diode to provide a negative potential to the cathode of said diode, and means for deriving a positive biasing potential from the automatic gain control and inversely thereto and applying this potential to the cathode of said diode to decrease the extent of limiting as the automatic gain control increases.

8. In combination with a carrier wave receiver having an automatic gain control, an output circuit, a demodulation circuit and a series limiter circuit interposed between said demodulation and output circuits for limiting the percentage modulation passed therebetween; a source of varying potential responsive to said automatic gain control, means for applying said potential to said limiter circuit to oppose conduction thereof, and means responsive to the output of said demodulation circuit and connected to said limiter circuit to apply a varying potential to said limiter circuit in opposition to the first-mentioned varying potential.

9. In combination with a carrier wave receiver having an automatic gain control, a tube having its cathode current controlled by said gain control, a detector circuit including a load impedance across which appears a unidirectional potential, and an output circuit; a limiter connected between said detector and output circuits to transmit noise and signal currents therebetween, means responsive to said unidirectional potential and coupled to said limiter for aiding the conduction thereof, and means responsive to the potential developed across at least a portion of the cathode circuit of said tube and coupled to said limiter for providing a biasing potential to said limiter in opposition to said unidirectional potential.

10. In a carrier wave receiver, an automatic gain control, a demodulation circuit, an output circuit, a series limiter circuit coupled between said demodulation and output circuits for limiting the percentage modulation passed therebetween, a variable source of positive potential inversely responsive to the automatic gain control, and means coupling said source to said limiter circuit for preventing the conduction thereof in the absence of a received signal of at least a predetermined strength.

11. In a carrier wave receiver, an automatic gain control, a demodulation circuit, an output circuit, means coupled between said demodulation and output circuits for conducting signals therebetween, means coupled to said automatic gain control for producing a potential inversely responsive thereto, and means coupling said conducting means and said potential producing means for applying said potential to said conducting means to prevent conduction thereof in the absence of a received signal of at least a predetermined strength.

12. In a carrier wave receiver having an automatic gain control, a demodulation circuit and an output circuit, a series limiter circuit interposed between said demodulation and output circuits for limiting the percentage modulation passed therebetween, and means connected to said demodulation and limiter circuits for opposing conduction thereof, said means including a source of varying potential responsive to the action of said automatic gain control.

13. In a carrier wave receiver having an automatic gain control, a tube having its cathode current controlled by said gain control, an output circuit, a demodulation circuit and a series limiter interposed between said demodulation and output circuits for limiting the percentage modulation passed therebetween, means for rendering said limiter circuit conducting, said means including a circuit connected between said demodulation and limiter circuits for furnishing to said limiter circuit a potential developed in said demodulation circuit from rectification of the input thereto, and means for decreasing the level at which limiting is effective including a source of potential responsive to the cathode current in said tube and connected to said limiter circuit.

JAMES C. COE.

REFERENCES CITED

The following references are of record in the file of this patent:

UNITED STATES PATENTS

| Number | Name | Date |
|---|---|---|
| 2,208,398 | Simons | July 16, 1940 |
| 2,221,728 | Travis | Nov. 12, 1940 |
| 2,233,339 | Brown, Jr. | Feb. 25, 1941 |
| 2,247,324 | Travis | June 24, 1941 |
| 2,248,267 | Bacon | July 8, 1941 |
| 2,300,115 | Grundman | Oct. 27, 1942 |
| 2,301,620 | Fowler | Nov. 10, 1942 |
| 2,345,762 | Martinelli | Apr. 4, 1944 |
| 2,418,389 | Andressen | Apr. 1, 1947 |
| 2,434,929 | Holland | Jan. 27, 1948 |

Certificate of Correction

August 15, 1950

Patent No. 2,518,449

JAMES C. COE

It is hereby certified that error appears in the printed specification of the above numbered patent requiring correction as follows:

Column 8, line 53, for "dector" read *detector*; column 9, in the table, third column thereof, for "1.0" read [1]*1.0*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*